United States Patent [19]

Hall et al.

[11] Patent Number: 4,663,856

[45] Date of Patent: May 12, 1987

[54] STRAP-ON LEVELING/PLUMBING DEVICE KIT

[76] Inventors: Spencer S. Hall, 50 Birch Hill Dr., Poughkeepsie, N.Y. 12602; Joseph M. Kistner, 33 Birch Hill Dr., Poughkeepsie, N.Y. 12603

[21] Appl. No.: 843,636

[22] Filed: Mar. 25, 1986

[51] Int. Cl.⁴ .............................................. G01C 9/28
[52] U.S. Cl. ........................................ 33/373; 33/381
[58] Field of Search ................. 33/347, 371, 372, 373, 33/381

[56] References Cited

U.S. PATENT DOCUMENTS 3,826,013  7/1974  Baher ..................................... 33/373
4,295,279 10/1981  Sienknecht ............................ 33/373
4,343,093  8/1982  Eadens ................................... 33/373

FOREIGN PATENT DOCUMENTS 1934717  2/1970  Fed. Rep. of Germany ........ 33/347

Primary Examiner—Richard R. Stearns
Attorney, Agent, or Firm—Joseph L. Spiegel

[57] ABSTRACT

A kit is provided which is primarily designed to facilitate the construction of a fence with vertical posts and horizontal rails. The kit includes a leveling/plumbing device having a central level for indicating a horizontal position, and an end level for indicating a vertical position. The device is attachable to a workpiece being positioned, by separable fasteners of the hook and loop type. The user can then use two hands to position the workpiece while observing the desired one of the levels.

7 Claims, 14 Drawing Figures

STRAP-ON LEVELING/PLUMBING DEVICE KIT

FIELD OF THE INVENTION

This invention relates to a kit including a leveling/plumbing device and fastening straps for attaching the device to an elongated workpiece, such as a fence part, to enable a user to level or plumb such workpiece, the kit being particularly useful for installing fence posts and rails.

BACKGROUND OF THE INVENTION AND PRIOR ART

When a fence is being installed, it is desirable to position the posts vertically and the rails horizontally. While this can be done by eye, it is also common to use a simple carpenter's level that includes two spirit levels, one for determining a horizontal position and the other for determining a vertical position. The level is held against the post or rail by one hand while the other hand is used to adjust the rail or post to its proper position. The disadvantage is that there are times when the user requires the use of both hands and must set down the level with the result that the rail or post can be moved without there being any indication of the degree of horizontal or vertical movement.

Within the prior art there are many leveling devices that provide indications of both horizontal and vertical positions of an item being leveled or plumbed. U.S. Pat. No. 928,600 shows a simple carpenter's level having two vials at right angles for indicating horizontal and vertical lines. The device has a generally cubical body adapted to be held against or set upon the workpiece.

U.S. Pat. No. 3,826,013 discloses a device particularly useful with rods, which device includes two bulls-eye levels. The device uses right angle surfaces to position the device against the workpiece and the device is manually held in place.

U.S. Pat. Nos. 2,757,458, 3,664,754 and 4,295,279 describe strap on leveling devices attached to drills allowing the user free use of both hands for drilling vertical and horizontal holes. U.S. Pat. No. 3,832,782 shows a level having magnets located near deverging legs, which magnets allow the level to be magnetically mounted upon a magnetically attracted workpiece.

Perhaps the closest prior art patent is U.S. Pat. No. 4,168,578 which shows a level having two right angular members, the inner surfaces of which would be placed against a workpiece. Several spirit levels are mounted on the external surfaces of the members to indicate both horizontal and vertical positions. Magnetic strips are attached to the inner surfaces allowing the level to be attached to magnetically attractable workpieces to free up the user's hands. The patent also indicates that the device can be secured to objects which are not metal "with a pliable or elastic strap, cord, or tension spring wrapped around the object..." to free the user's hands.

As described below, the invention makes use of a well known type of separable fastener of the type disclosed in U.S. Pat. No. 3,009,235. Such fastener includes two pieces of base material one of which has a multiplicity of loops and the other of which has a multiplicity of hooks. The two pieces can be pressed together whereby the hooks and loops interengage and hold the two pieces together along with whatever the pieces are fastened to. Several patents disclose the use of such a fastener for diverse purposes. U.S. Pat. No. 3,321,068 uses the fastener to support a thermometer. U.S. Pat. No. 3,358,141 uses straps of the material to fasten a child to a board to immobilize the child. U.S. Pat. No. 3,387,341 uses such a fastener to support a pen or pencil.

SUMMARY OF THE INVENTION

One of the objects of the invention is to provide a kit containing a leveling/plumbing device and straps for attaching the device to fence posts and rails so as to free the hands of the user and facilitate the rapid positioning of such workpieces.

Another object is to provide a leveling/plumbing device that can be readily attached to fence posts and rails of diverse cross sectional shapes including square, rectangular or round shapes, and of any material such as wood, plastic and both magnetic and non-magnetic metals.

A further object is to provide a leveling/plumbing device that is lightweight for ease of use and is rugged and dimensionally stable for prolonged use.

Still another object is to provide a kit containing a leveling/plumbing device and straps for attaching the device to a workpiece, the straps being readily attachable and detachable to facilitate the rapid erection of a fence including both posts and rails.

A still further object is to provide a cheap, simple, rugged leveling/plumbing device that effectively allows workpieces such as fence posts and rails to be leveled and plumbed.

Briefly, the invention comprises a kit having a leveling/plumbing device and two straps. The device has an elongated rigid body provided with two parallel positioning or aligning edges or surfaces. The edges are engageable with a workpiece to position the device parallel to the workpiece. Connected to the device are two halves of separable fasteners of the hook and loop type. The straps form the other halves of the fasteners, each strap being long enough to allow the user to wrap the strap around the workpiece and engage the free ends with the fastener half on the device to attach the device to the workpiece and free the hands of the user for leveling/plumbing the workpiece. The device also has two spirit levels for indicating horizontal and vertical orientations respectively.

BRIEF DESCRIPTION OF THE DRAWINGS

Other objects and advantages of the invention will be apparent from the following description taken in connection with the accompanying drawings wherein.

DETAILED DESCRIPTION OF THE INVENTION

Figure 1:
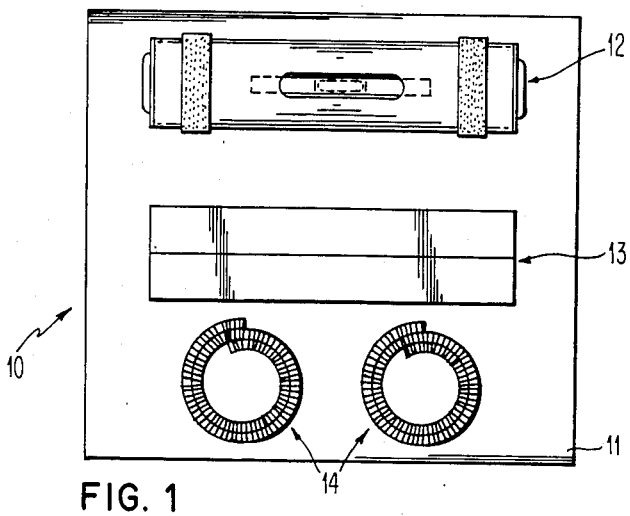
FIG. 1 is a top plan view of a kit constituting a first embodiment of the invention.

Referring now to the drawings, and first to FIG. 1, the embodiment of the invention there shown comprises a kit 10 housed in a box 11 or other package for distribution to the user. Kit 10 contains a leveling/plumbing device 12, an adaptor 13, and two straps 14 shown in coiled forms. Quite obviously, the kit can be packaged in other ways.

Figure 2:
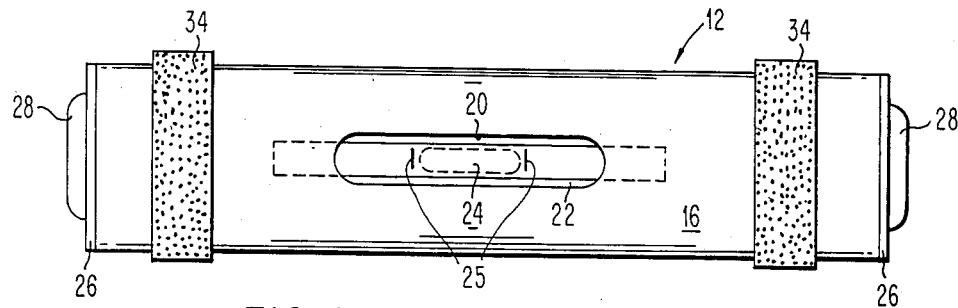
FIG. 2 is a top plan view, on an enlarged scale, of the leveling/plumbing device shown in FIG. 1.
Figure 3:
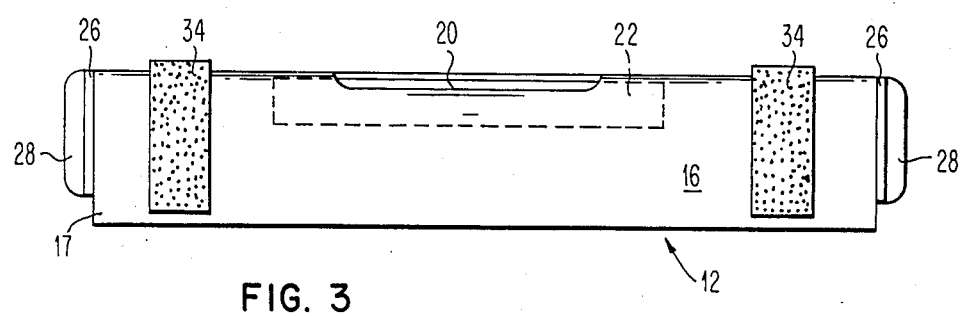
FIG. 3 is a side elevational view of the device shown in FIG. 2.
Figure 4:
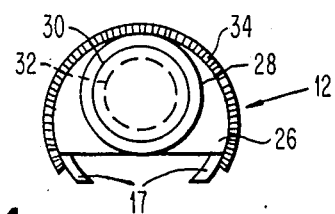
FIG. 4 is an end elevational view of the device shown in FIG. 2.

With reference to FIGS. 2–4, device 12 comprises an elongated body 16 of arcuate cross section, the lower portion of which is open to provide a pair of parallel edges 17 that are parallel to the axis of body 16. The body is formed from a rigid, plastic pipe having the lower portion removed to form edges 17. Body 16 also has a central window 20 opening upwardly, when device 12 is in the horizontal position. A tubular spirit level 22 is mounted inside body 16 directly beneath window 20 so that an air bubble 24, shown in dotted lines, and two centering lines 25 are visible to the user. Two end plates 26 are attached to the opposite ends of body 16 and form a somewhat box-like construction that strengthens body to form a more rigid structure. Mounted on plates 26 are two bulls-eye levels 28 each of which has a centering circle 30 useful in centering an air bubble 32. Levels 28 face in opposite directions to enable device 12 to be used at either end. Levels 28 are used for the plumbing function, i.e., to vertically align or position a workpiece. Two fastener or mounting strips 34 are attached to body 16 and extend around the periphery near the ends of device 12.

Figure 7:
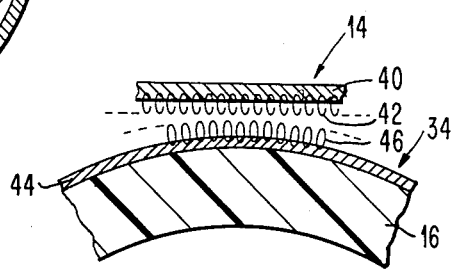
FIG. 7 is an enlarged, somewhat schematic view of the separable fastener used in the invention.

Straps 14 and strips 34 form readily attachable, readily detachable, separable fasteners and are of the type, disclosed in the above-mentioned U.S. Pat. No. 3,009,235, comprising a multiplicity of hooks interengageable with a multiplicity of loops. The loops and hooks are formed on two halves and the two halves are interchangeable. Referring to FIG. 7, strap 14 comprises a backing material 40 having a multiplicity of hooks 42 on one side thereof. Strip 34 has backing 44 adhesively connected or bonded to body 16. A multiplicity of loops 46 extend outwardly from backing 44. When hooks 42 and loops 46 are pressed together, they interlock with sufficient strength that it is difficult to separate them by pulling along the length of the backing material but will readily separate when pulled perpendicularly away from each other. Straps 14 are long enough to be wrapped around device 12 and a workpiece.

Figure 5:
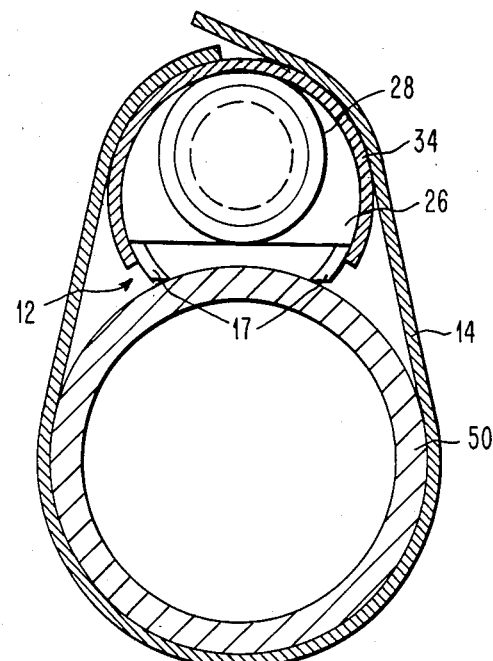
FIG. 5 is an end view illustrating how the leveling/plumbing device of the invention is attachable to a workpiece of round cross section.

Referring to FIG. 5, device 12 is shown attached to a round workpiece 50 which may be, for example, a metal fence post. When attached, device 12 extends along workpiece 50 with its axis parallel to the axis of workpiece 50. Edges 17 engage the outer surface of the workpiece and straps 14 are wrapped around device 12 and workpiece to secure them together. As shown, strap 14 is longer than necessary and has one end unattached. The free end could be cut off if desired but it provides a convenient handle to grip the strap and separate the fastener.

Figure 6:
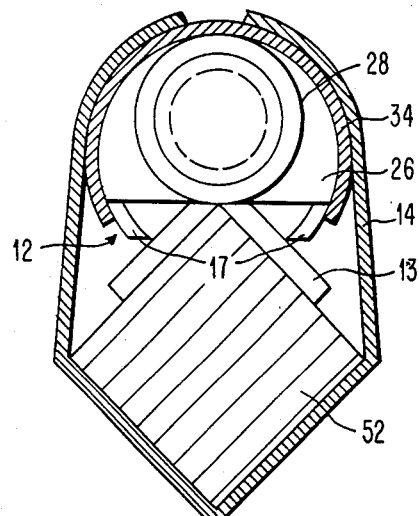
FIG. 6 is a view similar to FIG. 5 showing how the leveling/plumbing device is attachable to a workpiece of rectangular cross section.
Figure 8:
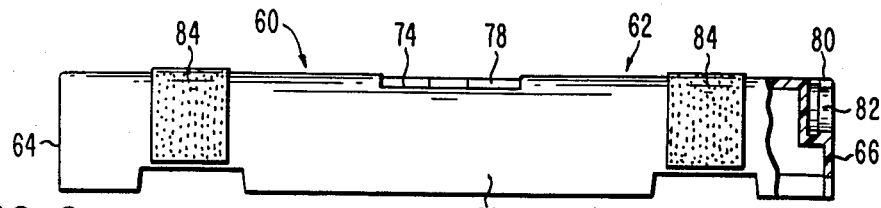
FIG. 8 is a side elevational view, with portions removed and partly in section, of a preferred form of a FIG. 9 is a top plan view of the device shown in FIG. 8.
Figure 9:
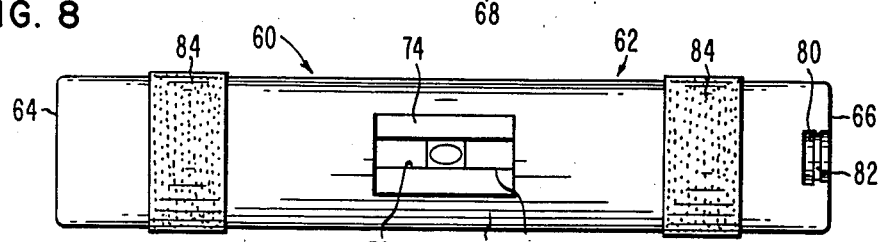
Figure 10:
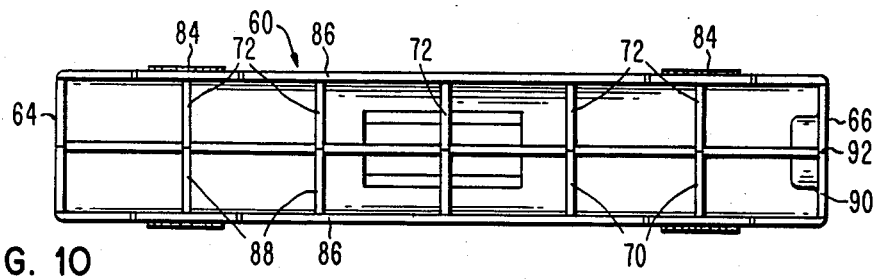
FIG. 10 is a bottom plan view of the device shown in FIG. 8.
Figure 11:
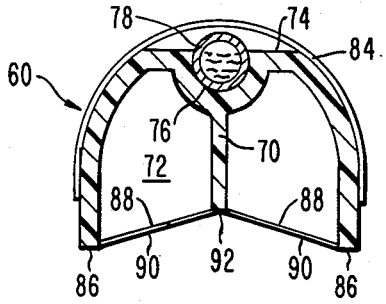
FIG. 11 is an enlarged cross sectional through a central portion of the device shown in FIG. 8.
Figure 12:
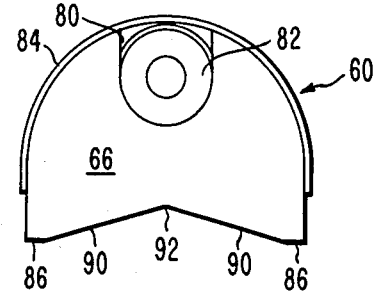
FIG. 12 is an enlarged and elevational view of the device shown in FIG. 8.

In FIG. 6, workpiece 52 is of square cross section. Adaptor 13 has the shape of an angle iron with two mutually perpendicular flanges. Adaptor 13 is fitted over one corner of the workpiece and device 12 has edges 17 abutting the outer surfaces of adaptor 13. Device 12 is positioned so that edges 17 extend parallel to the edges of the workpiece. The corner of adaptor 13 fits into the bottom opening of body 16 which opening is bounded on the sides by edges 17.

In use, device 12 is first positioned either in contact with a rounded workpiece or with adaptor 13, and the two straps 14 are attached at one end to strips 34, wrapped around the workpiece and then attached at the other end to strips 34. Once attached, the user is free to use both hands for the purpose of positioning the workpiece. Device 12 can then be detached simply by removing straps 14.

Referring now to FIGS. 8–11, plumbing/leveling device 60 comprises a rigid, hollow, lightweight body 62 molded from polystyrene having a high impact strength. Body 62 has an outer shell comprising two end walls 64 and 66 and a central portion 68 of U-shaped cross section. A longitudinal rib 70 extends through the interior of body 62 between end walls 64 and 66. Five transverse ribs 72 extend across the interior of the body between the sides of portion 68 and rib 70. Ribs 70 and 72 are joined to and merge with central portion 68 to strengthen body 62 and form a cellular interior.

Body 62 has a flat recessed surface 74 which faces outwardly from the central portion and has a semicylindrical recess 76 into which a tubular spirit level 78 is glued in place. The axis of level 78 is parallel to the axis of device 60. Body 62 also has a slotted recess 80 in end wall 66 into which a bulls-eye spirit level 82 is glued in place. Level 82 operatively extends perpendicularly to the axis of device 60. Levels 78 and 82 effectively lie at right angles to each other whereby level 78 is operative to indicate a horizontal orientation while level 82 indicates a vertical orientation. The outwardly facing surfaces of both levels are set back or recessed relative to the adjacent outer surfaces of body 62 to protect the levels from being accidently hit.

Two strips 84, the same as strips 34, are adhesively bonded to body 62 at longitudinally spaced positions and are engageable with two straps 14 (not shown in FIGS. 8–11 but in FIG. 1) to form fasteners for selectively attaching device 62 to a workpiece in a manner similar to that explained above.

Figure 13:
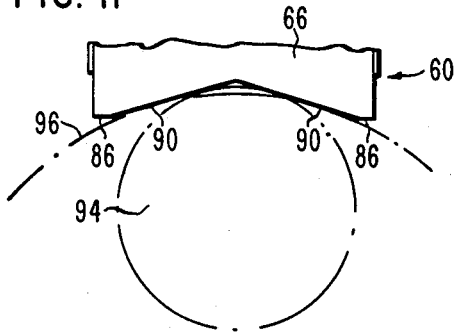
FIG. 13 is a schematic end view illustrating how the device shown in FIG. 8 abuts different size rounded workpiece surfaces.
Figure 14:
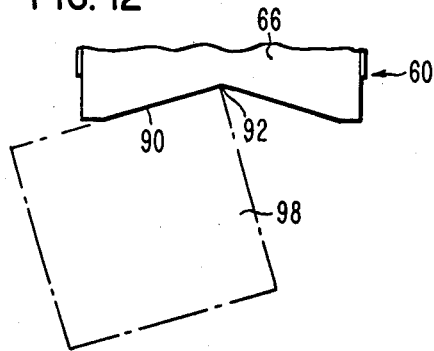
FIG. 14 is a view similar to FIG. 13 showing abutment with a workpiece having a straight edge.

Central portion 68 terminates in two parallel, laterally spaced surfaces or edges 86 which extend longitudinally and are parallel to the axis of level 82. Each of ribs 72 has a shallow V-shaped surface 88 which faces downwardly as viewed in FIG. 11 and lies slightly inwardly of similarly shaped surfaces 90 formed on the lower portions of end walls 64 and 66. The centers of surfaces 90 have vertices 92 useful in aligning workpieces having straight corners or edges. Surfaces 90 provide the primary aligning or bearing surfaces for abutting circular workpieces 94 (FIG. 13) of smaller diameters and edges 86 form aligning edges for larger diameter workpieces 96. Workpiece 98 (FIG. 14) having a flat surface provided with a straight corner or edge, can be aligned by wedging the edge into vertex 92 with the flat surface of a workpiece abutting one side of surfaces 90. The same workpiece abutment action occurs at surface 90 of end wall 64. In each case, two aligning surfaces (surfaces 90 of end walls 64 and 66 or edges 86) engage the workpiece at spaced points or lines to provide stable alignment of the device relative to a workpiece.

During use, device 60 is attachable to a workpiece in a manner similar to that described above for device 12. Device 60 would first be fitted or abutted against a workpiece so that its axis lies parallel to the longitudinal axis of a workpiece and straps 14 would be engaged with strips 84. The user can then view level 78 to horizontally postion the workpiece or view level 82 to vertically position the workpiece.

While each device was designed primarily for use in constructing a fence of vertical posts and horizontal rails, it should be obvious that it can be used for other types and shapes of workpieces. It should also be obvious that without the straps, this device could be used on any flat surface for leveling horizontally, the same as a conventional level. Further, each device can be attached to both magnetic and non-magnetic workpieces. It should also be apparent to those skilled in the art that changes can be made in the details and arrangement of parts without departing from the spirit and scope of the invention as defined in the appended claims.

What is claimed is:

1. A kit primarily adapted for plumbing or leveling elongated fence members of different cross sectional sizes and shapes, said kit comprising the combination of:
    a leveling/plumbing device comprising a body provided with first and second sets of aligning edges, fastening means mounted on said body, and level means mounted on said body for providing visual indications of the orientation of said device;
    and strap means engageable with said fastening means and adapted to be wrapped around a fence member to securably releasably attach said device thereto with one set of said aligning edges abutting said member and orienting said device relative to such member, whereby a user has both hands free to move and position such member while observing said leveling means;
    said leveling means comprising first and second levels mounted on said body and respectively providing visual indications of when said device is horizontal and vertical;
    said body being thin walled, rigid, hollow, lightweight and elongated, said body having a sidewall of arcuate cross section provided with two transversely spaced, parallel edges which form a first set of thin aligning edges that are adapted to abut relatively large size fence members at points on transversely spaced lines running longitudinally along such members, said body further having two end walls connected to said sidewall at different ends of said body to form a rigid boxlike structure, said endwalls each having a V-shaped edge extending transversely across said body, said edges of said end walls forming a second set of thin aligning edges adapted to abut relatively small fence members at two sets of points spaced longitudinally along the lengths of such fence members by a distance substantially equal to the length of said body.

2. The combination of claim 1 wherein said body is of plastic material and has a cellular interior structure to provide a strong lightweight, dimensionally stable body.

3. The combination of claim 2 wherein said cellular structure comprises a first rib extending longitudinally through the interior of said body and a series of transverse ribs extending across the interior of said body at spaced locations along said first rib.

4. The combination of claim 3 wherein said body has first and second recesses therein in which said first and second levels are mounted, said first recess and said first level being located centrally of said body, said second recess and said second level being in one of said end walls.

5. The combination of claim 4 wherein said first level comprises an elongated tube having an air bubble therein, and said second level is a bulls-eye level.

6. The combination of claim 1 wherein said fastening means and said strap means have a multiplicity of releasably interlockable hooks and loops.

7. The combination of claim 6 wherein said fastening means comprises two strips attached to said body on either side of said first recess and equidistant from the ends of said body, and said strap means comprises two straps selectively engageable with said strips.

* * * * *